US010506510B2

(12) United States Patent
Lee et al.

(10) Patent No.: US 10,506,510 B2
(45) Date of Patent: Dec. 10, 2019

(54) METHOD FOR INCREASING LIFETIME OF NETWORK DEVICES IN A MULTI-HOP STRUCTURED WIRELESS COMMUNICATION SYSTEM

(71) Applicant: Seoul National University R&DB Foundation, Seoul (KR)

(72) Inventors: Yong Hwan Lee, Seoul (KR); Jae Seok Bang, Seoul (KR); Jin Seok Han, Gunpo-si (KR)

(73) Assignee: Seoul National University R&DB Foundation, Seoul (KR)

( * ) Notice: Subject to any disclaimer, the term of this patent is extended or adjusted under 35 U.S.C. 154(b) by 51 days.

(21) Appl. No.: 15/820,657

(22) Filed: Nov. 22, 2017

(65) Prior Publication Data

US 2018/0146425 A1 May 24, 2018

(30) Foreign Application Priority Data

Nov. 23, 2016 (KR) .................. 10-2016-0156762

(51) Int. Cl.
*H04W 52/02* (2009.01)
*H04W 40/12* (2009.01)
(Continued)

(52) U.S. Cl.
CPC ....... *H04W 52/0206* (2013.01); *H04W 40/12* (2013.01); *H04W 24/04* (2013.01);
(Continued)

(58) Field of Classification Search
CPC . H04W 52/0206; H04W 40/12; H04W 24/04; H04W 84/20
See application file for complete search history.

(56) References Cited

U.S. PATENT DOCUMENTS

2008/0232334 A1* 9/2008 Das .................. H04W 48/08
370/337
2013/0316642 A1* 11/2013 Newham ........... H04W 52/0206
455/11.1

(Continued)

FOREIGN PATENT DOCUMENTS

KR 1020070063118 A 6/2007
KR 1020140097910 A 8/2014

OTHER PUBLICATIONS

Muruganathan, et al. "A Centralized Energy-Efficient Routing Protocol for Wireless Sensor Networks", IEEE Radio Communications, Mar. 2005: S8-S13.

*Primary Examiner* — Peter Chen
(74) *Attorney, Agent, or Firm* — The Webb Law Firm

(57) ABSTRACT

Provided is a method for increasing the lifetime of devices of a cluster-tree structured multi-hop wireless communication system which uses a battery as the main power and includes an access point (AP) managing network operation and a plurality of devices connected to the AP, wherein some network devices operates as a router capable of having its child devices, the rest of the network device operate as an end device incapable of having its child devices, and the AP, the routers, and the end devices are connected in a parent-child device relationship. The method includes equalizing the average power consumption of each device by exchanging the roles of the router and the end device requiring different power consumption without interrupting normal network operation.

11 Claims, 5 Drawing Sheets

(51) Int. Cl.
*H04W 24/04* (2009.01)
*H04W 84/20* (2009.01)

(52) U.S. Cl.
CPC ............ *H04W 84/20* (2013.01); *Y02D 70/00* (2018.01); *Y02D 70/142* (2018.01); *Y02D 70/144* (2018.01); *Y02D 70/162* (2018.01)

(56) References Cited

U.S. PATENT DOCUMENTS

2016/0112950 A1\* 4/2016 Caracas ............ H04W 52/0219 370/311
2017/0161786 A1\* 6/2017 Terazaki ............... H04W 84/20

\* cited by examiner

METHOD FOR INCREASING LIFETIME OF NETWORK DEVICES IN A MULTI-HOP STRUCTURED WIRELESS COMMUNICATION SYSTEM

CROSS-REFERENCE TO RELATED APPLICATION

This application claims priority to Korean Patent Application No. 10-2016-0156762 filed Nov. 23, 2016, the disclosure of which is hereby incorporated in its entirety by reference.

BACKGROUND OF THE INVENTION

1. Field of the Invention

The present invention relates to a multi-hop structured wireless communication system, and more particularly, to a multi-hop structured wireless communication system and an operating method thereof, capable of increasing network device lifetime and network lifetime as well by making a router requiring high power consumption and an end device requiring low power consumption exchange their role each other.

2. Description of the Related Art

With recent developments of communication technologies, Wireless Sensor Network (WSN) has received much attention, which can collect desired information in real time from many sensor devices installed in various places and can fast respond to the change of operation environments. Since network devices in a WSN need to operate in a battery-powered mode, it may not be practical to use high-complexity technologies applied to legacy cellular systems and thus it is indispensable to use low-complexity technologies that can support desired performance.

WSN has a multi-hop structure comprising a main communication device (referred to access point (AP)), that manages network operation, and a plurality of network devices. In a multi-hop structured network, only a small number of network devices operate as a router that can have its child devices, and the others operate as an end device that cannot have its child device. The end devices are connected to the AP or a router in a parent-child relationship, and the AP and the routers are connected in a tree structure.

In a legacy multi-hop structured communication network, the router may require power consumption approximately three to ten times higher than the end device. Thus, when the network devices operate in a battery-powered mode of an equal power capacity, the routers may suffer from power depletion much faster than the end devices, reducing network lifetime. Off-the-shelf technologies proposed to resolve this problem include a method that reconstructs the network while temporarily interrupting network operation. However, this method cannot make data transmission and reception during the network reconstruction, interrupting the WSN operation. Off-the-shelf technologies may take longer time for the network reconstruction as the WSN size increases, making it impractical for application to large-scale WSNs.

SUMMARY OF THE INVENTION

One or more embodiments of the present invention include an operating method in a multi-hop structured large-scale wireless communication system that comprises a large number of network devices operating in a battery-powered mode, capable of increasing network device lifetime and thus increasing network lifetime, by changing roles of a router and an end device requiring different power consumption and thus equalizing average power consumption of the network devices without interrupting normal network operation.

According to one or more embodiments of the present invention, there is provided a method for increasing lifetime of network devices of a cluster-tree structured multi-hop wireless communication system which comprises a main network control device, referred to access point (AP), manage network operation and a plurality of network devices connected to the AP, wherein some network devices operate as a router capable of having its child devices, the rest of the network devices operate as an end device incapable of having its child devices, and the AP, the routers and the end devices are connected in a parent-child device relationship, the method including equalizing average power consumption of network devices by exchanging the role of the router and the end device requiring different power consumption without interrupting normal network operation.

The method of equalizing average power consumption of network devices by exchanging the role of the router and the end device requiring different power consumption without interrupting normal network operation may include: (A) by a parent device, selecting one of its child routers in a sequential manner and selects one of its child end devices that can take the role of the selected child router in consideration of network connectivity and battery condition of its child end devices; and (B) by the parent device, making the selected child router operate as an end device, and making the selected child end device operate as a router to take the role of the selected child router, without interrupting normal network operation.

(A) may include: (A-1) by the parent device, sequentially selecting its child router in an one by one manner, and transmitting a role-change start message to the selected child router and all of its child end devices having the same network depth as the selected child router without interrupting normal network operation; (A-2) by the selected child router that has received the role-change start message, repeatedly transmitting a role-change router information message including information on its router role a predetermined number of times; (A-3) by the child end devices that have received the role-change start message, attempting to receive the role-change router information message transmitted by the selected child router; (A-4) by the child end devices that have received the role-change router information message, transmitting to the parent device a role-change candidate message that includes signal strength of the received role-change router information message signal, their battery condition and previous operation record as a router; and (A-5) by the parent device, selecting a child end device having a best condition among its child end devices that have transmitted the role-change candidate message, as the device that can take the role of the selected child router.

The method may further include, by the parent device, repeating (A-1) when it fails to receive the role-change router information message transmitted by the selected child router in (A-2).

(A-5) may include: by the parent device, selecting an end device that has experienced the highest received signal strength and has remaining battery power larger than a reference value among its child end devices that did not operate as a router previously, as the device that can take the role of the selected child router; and by the parent device, in the presence of no end device satisfying the above condition, selecting an end device that has experienced the highest received signal strength among its child end devices that have remaining battery power larger than that of the selected child router, as the device that can take the role of the selected child router.

(B) may include: (B-1) by the parent device, transmitting a role-change message to the child router and the child end device selected through (A) with its other data during its regular communication interval, and making the selected child router as its child end device and then the selected child end device as its child router; (B-2) by the selected child router, operating as an end device by using the address of the child end device included in the role-change message after receiving the role-change message; and (B-3) by the selected child end device, operating as a router by using the address of the selected child router included in the role-change message after receiving the role-change message.

(B-3) may include: by the selected child end device, operating as a router by using the address of the selected child router included in the role-change message after receiving the role-change message, and confirming network operation with its child devices; by the device operating as a router, transmitting a role-change-enable message to its parent device after confirming normality of network operation; and by the device operating as a router, transmitting a role-change-unable message to the parent device and starting to operate as the end device as being before, after confirming abnormality of network operation.

The method may further include, by the parent device, when the parent device has received the role-change-unable message, selecting an end device as the device that can take the role of the selected child router among its child end devices except the end device that has transmitted the role-change-unable message, in consideration of network connectivity and remaining battery power condition; and transmitting a role-change message to the end device to make the end device operate as a router through (B-3).

The device operating as a router may make its child devices change their roles through (A) and (B).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
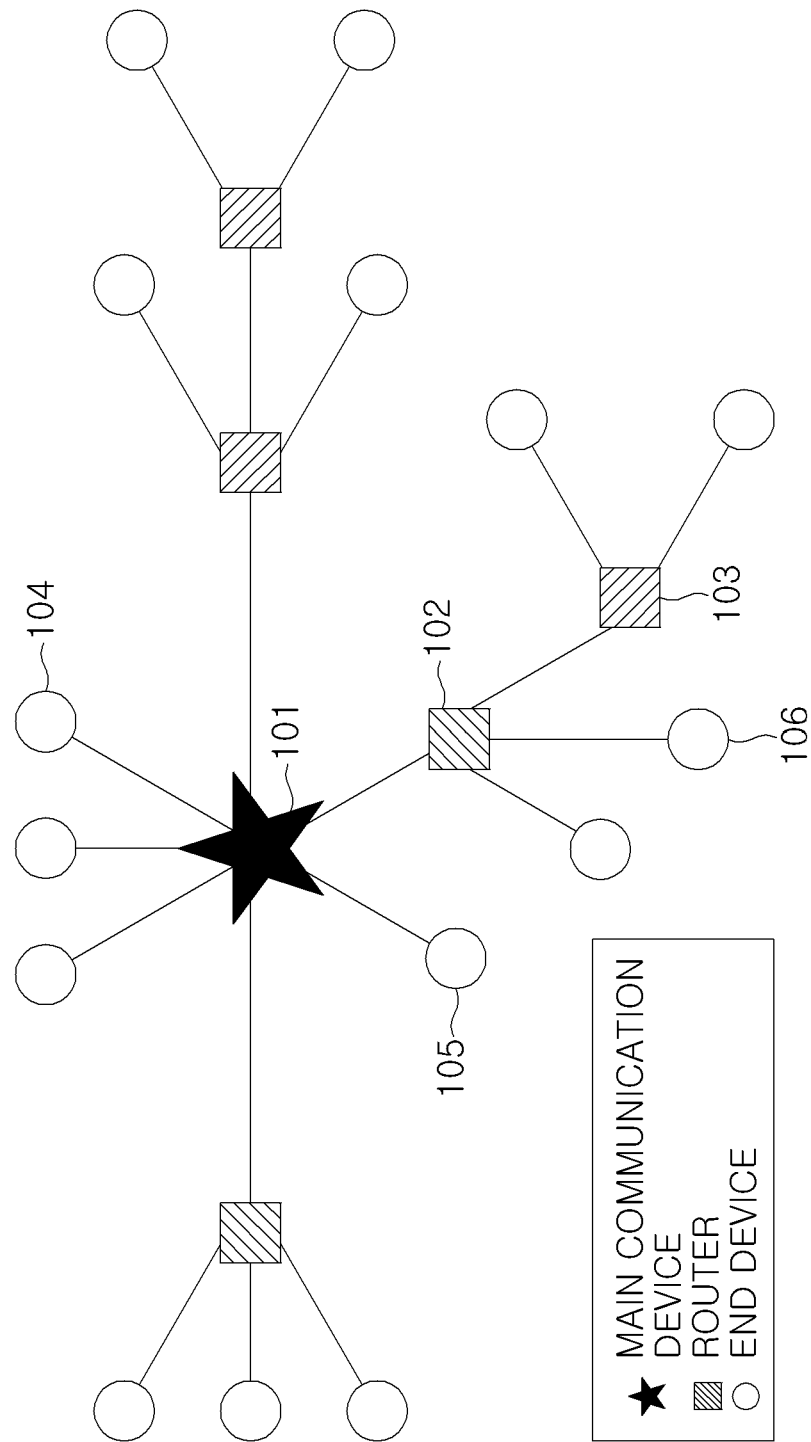
FIG. 1 illustrates a concept of a wireless communication system based on a multi-hop structure, according to an embodiment of the present invention.

Hereinafter, embodiments of the present invention will be described in detail with reference to the accompanying drawings. The same elements are denoted by the same reference numerals throughout the drawings. Also, detailed descriptions of related well-known functions and/or configurations are omitted. The following descriptions focus on parts necessary for understanding operations according to various embodiments. Descriptions of elements will be omitted if they are considered to unnecessarily obscure the gist of the present invention. Also, some elements in the drawings may be exaggerated, omitted, or schematically illustrated. Sizes of elements do not entirely reflect the actual sizes, and therefore, the descriptions provided herein are not limited by relative sizes or intervals of elements illustrated in the drawings.

FIG. 1 illustrates a concept of a multi-hop structured wireless communication system according to an embodiment of the present invention.

Referring to FIG. 1, a wireless communication system with battery-powered large-scale devices, according to an embodiment of the present invention, has a structure in which a main communication device (referred to access point (AP)) 101 configured to perform an overall control and management of a network, and one or more routers 102 or one or more end devices 104 connected to the main communication device 101 form a multi-hop structured clustertree. The router 102 is connected to a child device (another router 103 or an end device), and the end device 104 does not have a child device. Regarding any pair of devices connected directly, a device connected to the AP 101 by the less hops is referred to as a parent device, and a device connected to the main communication device 101 by the more hops is referred to as a child device. That is, the AP 101 always operates as a parent device, the router operates as both a parent device and a child device (for example, the router 102 is a child device of the AP 101 and a parent device of another router 103), and the end device always operates as a child device.

In an embodiment of the present invention, the AP 101 may equalize power consumption of the devices within the network by starting a role-change process. First, the AP 101 sequentially selects one of its child routers one by one manner then finds and selects a child end device capable of taking the role of the selected child router. The selected child end device (e.g., 105) may be a device that has low cumulative power consumption and is geographically close to the child router (e.g., 102), thereby easily accommodating a subtree of the child router and ensuring connectivity to the child devices of the child router.

Then, the AP 101 makes the child end device (e.g., 105) and the child router (e.g., 102) exchange roles each other, that is, the child end device (e.g., 105) takes the role of the child router (e.g., 102), and the child router (e.g., 102) takes the role of the child end device (e.g., 105). The two devices exchange all the things to take the role of each other (e.g., network address and resources allocated to the devices). Accordingly, one of the two devices operates as if it is the other, and vice versa. For example, a child device of the child router before the role-change may recognize the role-changed child end device as a parent device and operate as it has before.

The device that has become a router through the role-change process further starts a role-change process of its child devices. By performing aforementioned processes, the role-change between routers and end devices may be gradually carried out over the entire network. As a result, power consumption of the devices may be equalized by the role-switching process without interrupting the network operations, greatly increasing the network lifetime.

According to one or more embodiments, the devices on the multi-hop cluster-tree structure may be sensor nodes constituting wireless sensor networks (WSN). The devices may collect temperature, humidity, sound, vibration, pressure, motion, and contamination information, etc. and transmit the collected information to the AP 101 or another sink node. In the present embodiment, it is assumed that these devices operate with batteries and constitute a network using wireless communication technology such as ZigBee, Bluetooth low-energy, Wi-Fi etc.

Hereinafter, the operation of the wireless communication system based on the multi-hop structure, according to an embodiment of the present invention, will be described in detail with reference to FIGS. 2 to 5.

Figure 2:
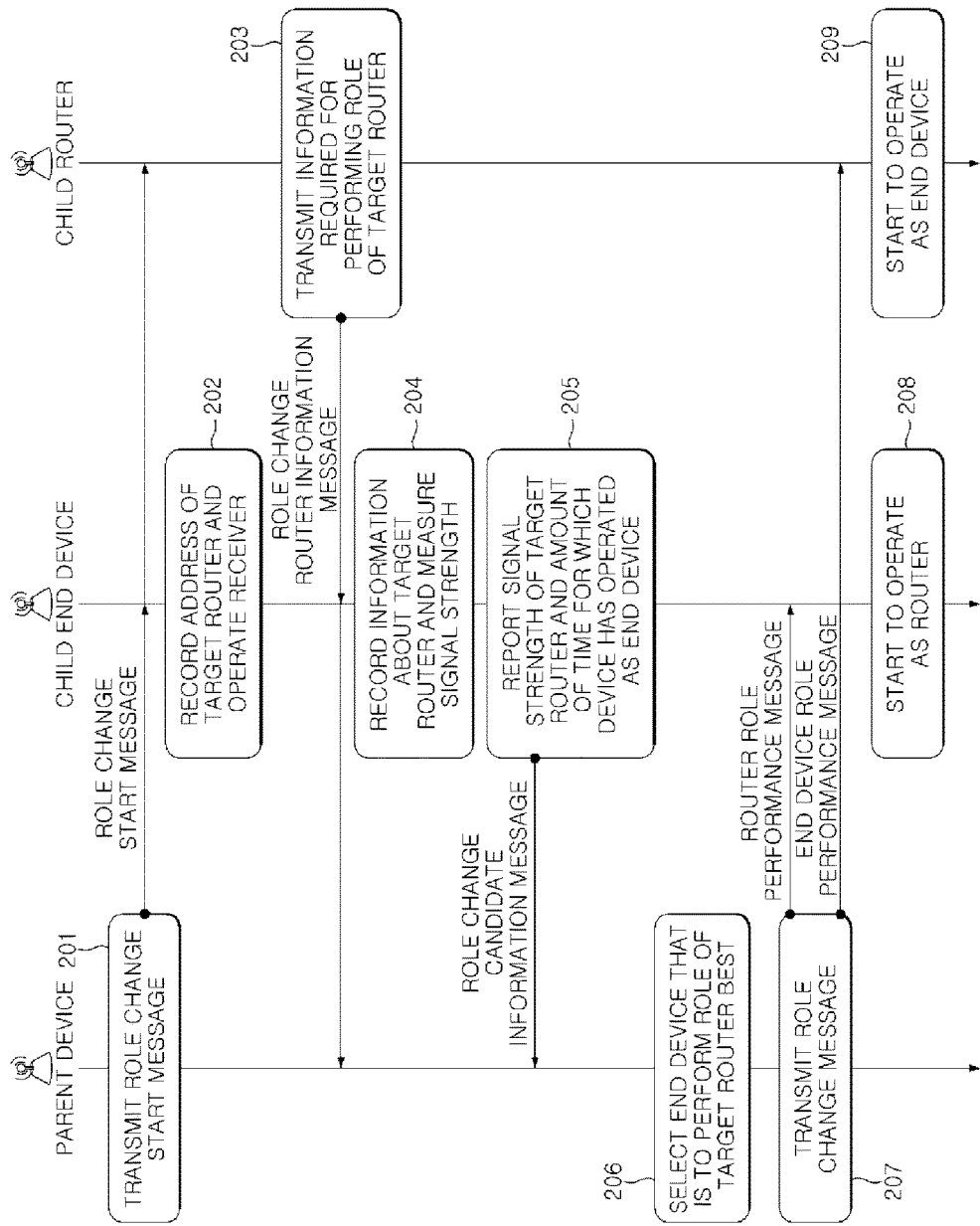
FIG. 2 is a flowchart of a process of, by a parent device, changing the roles of a child router and a child end device in a wireless communication system, according to an embodiment of the present invention.

FIG. 2 is a flowchart of a process of, by a parent device, changing the roles of a child router and a child end device in a wireless communication system, according to an embodiment of the present invention. Hereinafter, for convenience of explanation, a child router whose role is to be changed to an end device will be referred to as a target router.

First, the parent device (e.g., 101) transmits a role-change start message including an address of the target router (e.g., 102) (201). The parent device (e.g., 101) may sequentially select one of its child router as the target router one by one manner in a predetermined interval and transmit the role-change start message to the selected router and all child end devices (e.g., 104 and 105), which have the same network depth as the selected router, without interrupting normal network. The role-change start message may be transmitted in a broadcast manner and may be received by all its child end devices and child routers.

The target router that has received the role-change start message transmits the role-change router information message including information (role-change target router information) required for another device to take the role of the target router (203). The role-change router information message may be transmitted in a broadcast manner and may be received by the parent device and the child end devices of the parent device (i.e., its siblings).

When the parent device fails to receive a role-change router information message from the selected child router, the parent device may select another router as the target router and transmit the role-change start message to the selected router by repeating the aforementioned process.

The child end devices (e.g., 105 and 106) that have received the role-change start message record the address of the target router and operate a receiver to receive the role-change router information message transmitted by the target router (202).

The end devices that have received the role-change router information message store the information transmitted by the target router and measure signal strength of the role-change router information message signal (204). Then, the end devices transmit, to the parent device, a role-change candidate message including a battery condition (e.g., remaining charge), the measured signal strength, and an amount of time for which the device operated as the end device previously (or information about whether the child end device has performed the role of the router or not) (205).

The parent device selects an end device that can best take the role of the target router, considering the battery condition (e.g., remaining charge), the reported signal strength, and the amount of time for which the device operated as an end device (206). The parent device transmits, to the selected end device and the target router, a router role-change message and an end device role-change message (207). The parent device may ensure that the network connectivity would be maintained considering the reported signal strength of the selected end device, and may ensure that the selected child end device would operate as a router for a desired amount of time considering the reported battery condition (and/or the amount of time for which the device operated as an end device).

For example, the parent device may select an end device that has reported the highest signal strength and has a battery condition in which the remaining charge is equal to or greater than a reference value, among child end devices that have not taken the router-role, as a device that can take the role of the selected child router. On the other hand, when there is no end device satisfying the above condition, the parent device may select an end device that has reported the highest received signal strength, among the child end devices whose remaining charge is larger than the target router, as a device that can take the role of the child router.

The end device that has received the router role-change message starts to operate as a router after a predetermined time interval (208). The target router that has received the end device role-change message starts to operate as an end device after a predetermined time interval (209). In this manner, the parent device may exchange the roles of the child router and the child end device each other.

After the selected child end device receives the router role-change message and starts to operate as a router using the address of the target router that is contained in the router role-change message, the child end device checks networking and communication functions with its child devices. When the networking and communication functions with the child devices are normal (when the function as the router is normal), the device that has started to operate as a router may transmit role-change-enable message to the parent device. When the networking and communication functions with the child devices is abnormal, the device that has started to operate as a router may transmit a role-change-unable message to the parent device and return to operate as the previous end device after a predetermined time interval.

When the parent device receives the role-change-unable message, the parent device may exclude the end device among the child end devices candidates which is established in operation 205 and may select another end device having the best condition as the device that can take the role of the child router (206), and may transmit the router role-change message to the corresponding end device to make the corresponding operate as a router using the same operation 208. The process of reselecting the end device may be repeated a predetermined number of times.

As described above, it is possible to equalize average power consumption of the devices by changing the roles of the child router and the child end devices having different power consumption without interrupting network operation of the wireless communication system.

Figure 3:
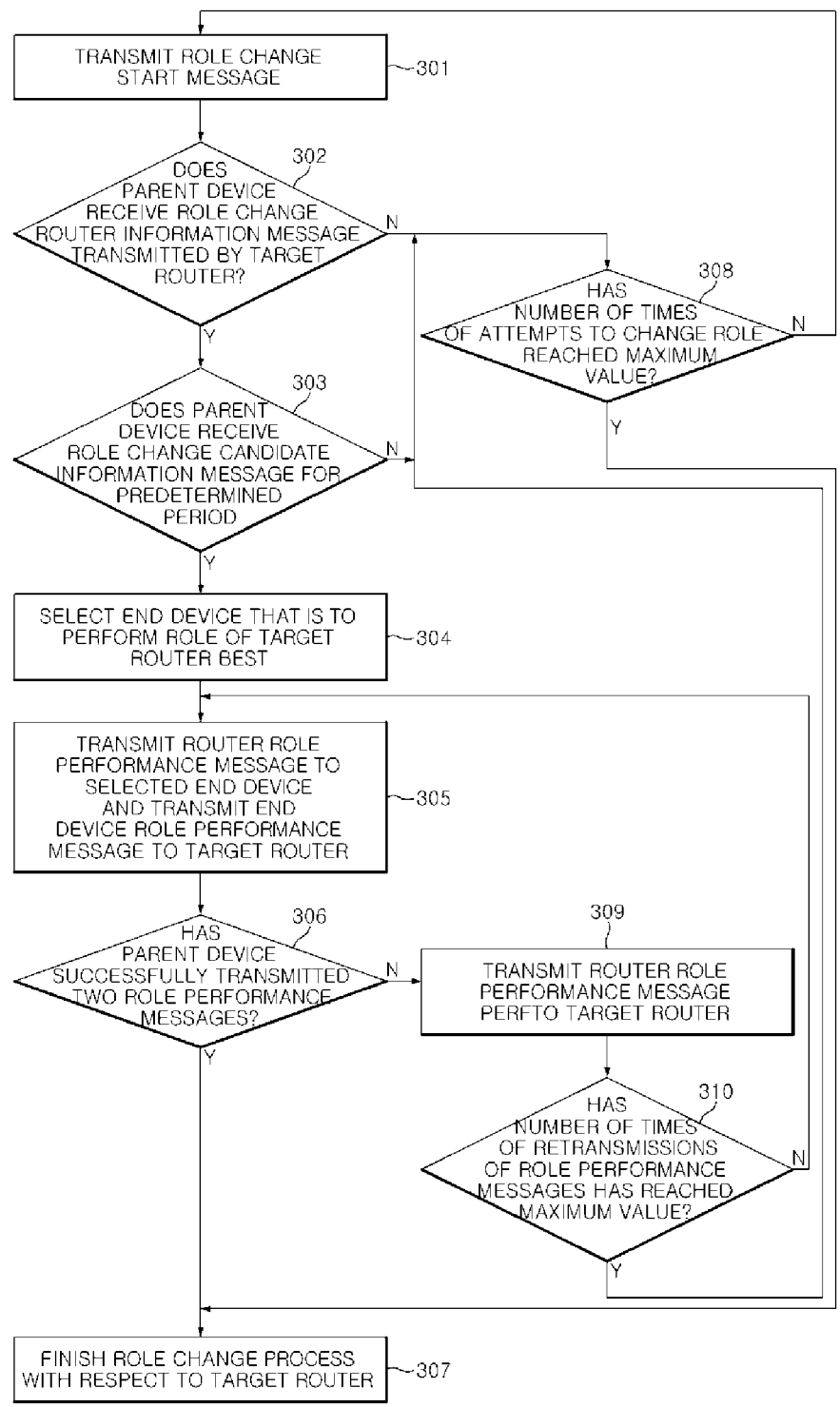
FIG. 3 is a detailed flowchart of operations 201, 206, and 207 of the parent device of FIG. 2.

FIG. 3 is a detailed flowchart of operations 201, 206, and 207 of the parent device of FIG. 2.

Referring to FIG. 3, the parent device transmits the role-change start message including the address of the target router in a broadcast manner (301).

If the parent device has successfully received the role-change router information message transmitted by the target router (302), the parent device starts to receive the role-change candidate message transmitted by the child end devices for a predetermined time interval (303). If the parent device has received at least one role-change candidate message, the parent device proceeds to operation 304. If the parent device has failed to receive the role-change router information message (302), or if the parent device has received no role-change candidate message (303), the parent device checks whether the number of attempts to change the role of the target router has reached a maximum value (308). If the number has not reached the maximum value, the parent device returns to operation 301 to perform the role-change process again. If the number has reached the maximum value, the parent device returns to operation 307 to finish the role-change process of the target router.

In the operation 304, the parent device selects an end device that can best take the role of the target router. In order to maintain the network connectivity (to preserve packet forwarding function of the target router), it is preferable to select an end device that is close to the target router. And, in order to equalize power consumption of the devices within the network, it is preferable to select an end device that has operated as an end device for a long time and thus has consumed less power, rather than an end device that has operated as an end device for a short time (i.e. rather than an end device who has operated as a router). To this end, according to one or more embodiments, the end device transmits a role-change candidate message which contain signal strength of the role-change router information message signal (a physical distance between the end device and the target router can be estimated from this information) and the amount of time for which the end device has operated as an end device. The parent device selects an end device that has reported the highest signal strength among end devices that have operated as end devices for the largest amount of time (for example, devices having operated end devices for more than a predetermined time interval), as the end device that can take the role of the target router.

Then, the parent device transmits a router role-change message to the selected end device, transmits an end device role-change message to the target router, and receives acknowledgements from the corresponding devices (305). When the parent device has successfully transmitted the two role-change messages during a predetermined time interval (i.e. acknowledgements has been received) (306), the parent device finishes the role-change process with respect to the target router (307).

When the parent device fails to transmit the two role-change messages (306), the parent device transmits the router role-change message to the target router so as to cancel the attempt to change the role of the target router to the end device (309). Then, the parent device checks whether the number of retransmissions of the two role-change messages has reached the maximum value (308). When the number has not reached the maximum value, the parent device returns to operation 305 to retransmit the two role-change messages (310). When the number has reached the maximum value (310), the parent device checks whether the number of attempts to change the role with respect to the corresponding target router has reached the maximum value (308). When the number has not reached the maximum value, the parent device returns to operation 301 to perform the role-change process again. When the number has reached the maximum value, the parent device proceeds to operation 307 to finish the role-change process with respect to the target router.

Figure 4:
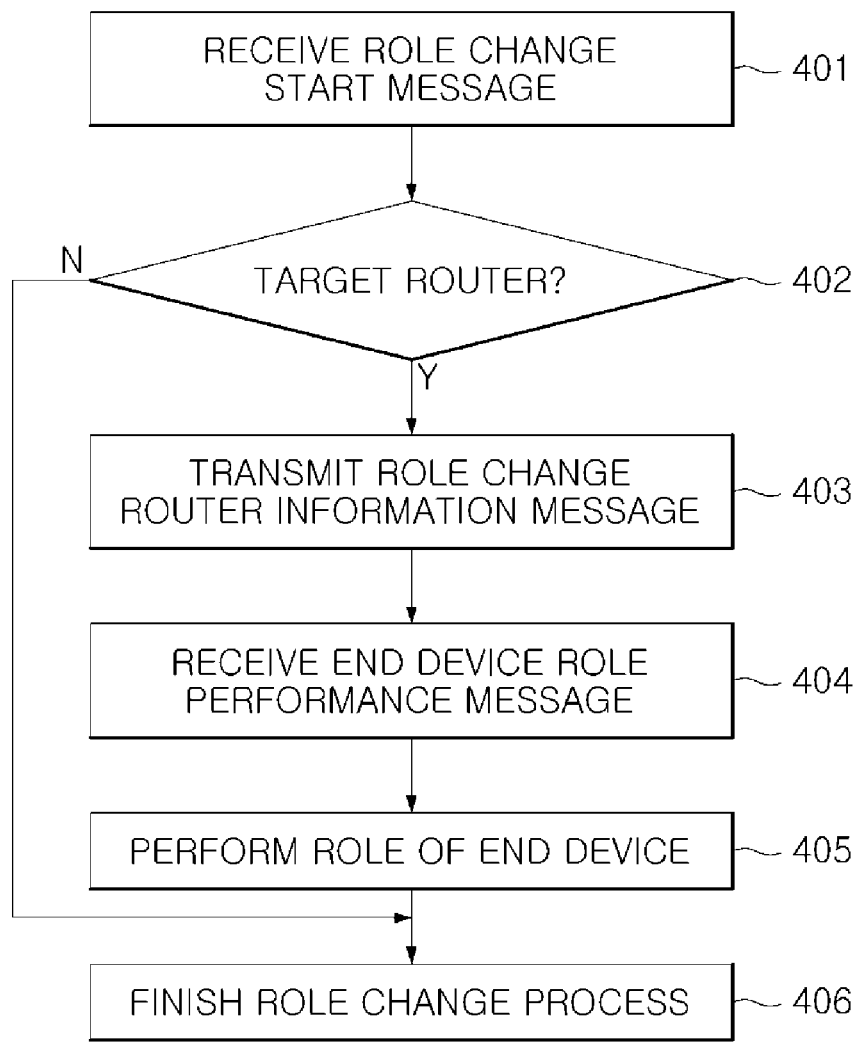
FIG. 4 is a detailed flowchart of operations 203 and 209 of the child router of FIG. 2.

FIG. 4 is a detailed flowchart of operations 203 and 209 of the child router of FIG. 2.

Referring to FIG. 4, when a child router receives the role-change start message from the parent device (401), the child router compares the address of the target router contained in the role-change start message with its address and if the addresses do not match, the child router determines that it is not the target router (402) then finishes the role-change process (406).

If the addresses match (the child router is the target router) (402), the child router transmits the role-change router information message in a broadcast manner (403). The role-change router information message contains all pieces of information required for another device to take the role of the child router. For example, in a communication system in which transmission resources composed of frequency bands and time intervals are allocated to each router and the router and the child device thereof transmit and receive signals by using the transmission resources, the role-change router information message must contain information about the transmission resources (frequency bands and time intervals).

Then, the child router (i.e., the target router) waits until the child router receives the end device role-change message. When the child router receives the end device role-change message (404), the child router changes its own address to the address of the end device that is contained in the corresponding message then start to operate as an end device (405), and finishes the role-change process (406).

Figure 5:
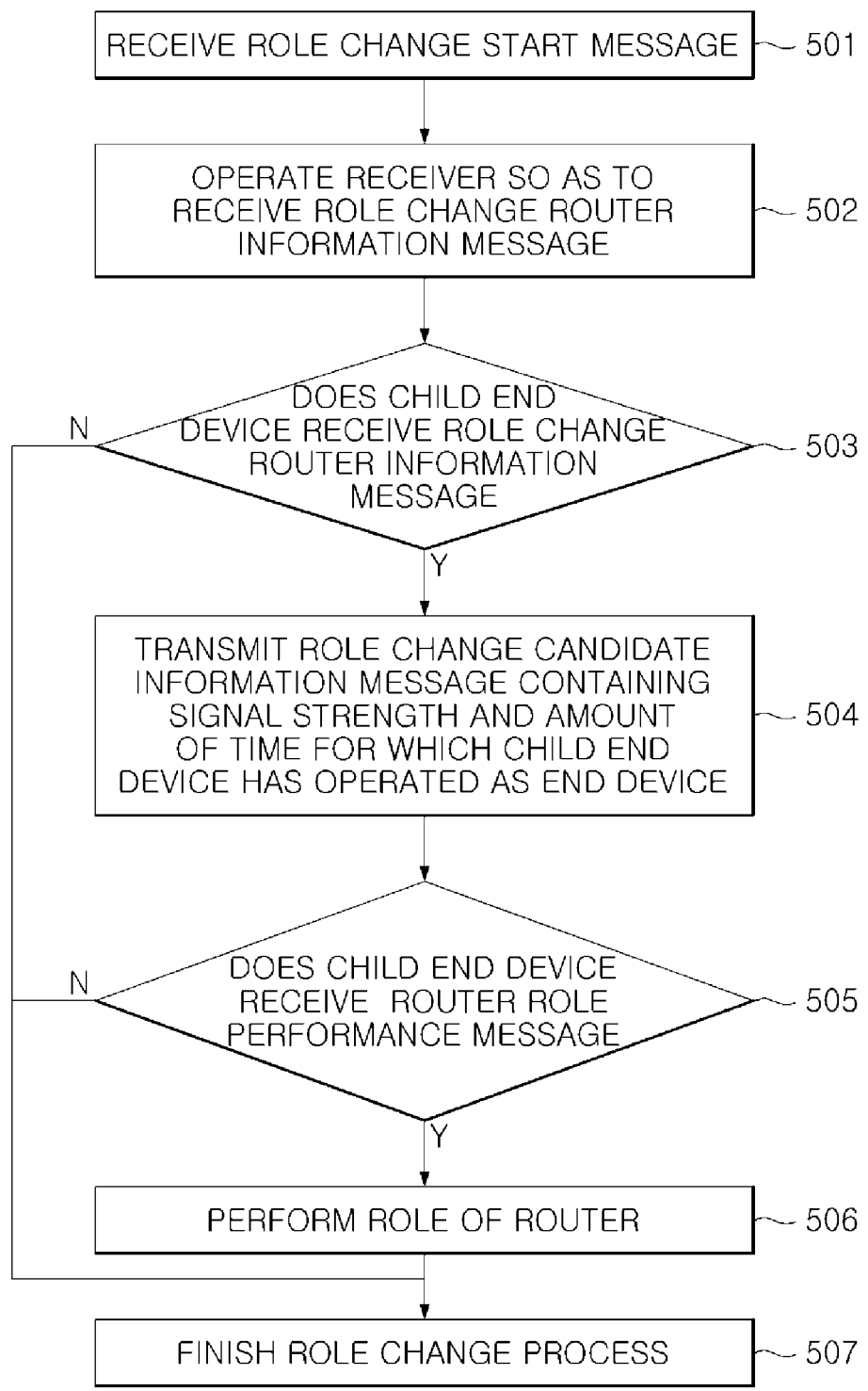
FIG. 5 is a detailed flowchart of operations 202, 204, 205, and 206 of the child end device of FIG. 2.

FIG. 5 is a detailed flowchart of operations 202, 204, 205, and 208 of the child end device of FIG. 2.

Referring to FIG. 5, when the child end device receives the role-change start message (501), the child end device turn on its receiver for a predetermined time interval so as to receive the role-change router information message transmitted by the target router (502).

When the child end device receives the role-change router information message from the target router (503), the child end device records the signal strength of the corresponding message signal and the role-change target router information (e.g. address, transmission resources, etc.) contained in the corresponding message. Then, the child end device transmits, to the parent device, the role-change candidate message including the battery condition (e.g., remaining charge), the signal strength, and the amount of time for which the child end device has operated as an end device (504).

On the other hand, when the child end device fails to receive the role-change router information message (503) (for example, when the child end device fails to receive the signal because the child end device is physically far away from the target router), the child end device recognizes that it is disqualified to be a role-change candidate and finishes the role-change process (507).

When the child end device receives the router role-change message from the parent device (505), the child end device starts to take the role of the router by using the recorded target router information (506) and finishes the role-change process (507). When the child end device fails to receive the router role-change message (506) (for example, when another end device is selected as a role-change target), the child end device finishes the role-change process (507).

According to one or more embodiments, the above-described method may change the roles of the routers within the network to the end device, thereby greatly increasing network lifetime. According to one or more embodiments, the role-change process may be performed with less message overheads by using broadcast characteristics of the wireless communication, and the data transmission and reception of the network may be performed even during the role-change by changing the roles of the devices without reconstructing the network. Consequently, one or more embodiments of the present invention are very suitable for WSN applications.

Although the process of, by the parent device (e.g., 101), changing the roles of the child router (e.g., 102) and the child end device (e.g., 105) has been described above, embodiments of the present invention are not limited thereto. It will be understood by those of skilled in the art that the device (e.g., 105) changed to the router performs the same function as the parent device of FIG. 2 to change the roles between the child device (e.g., 103, 106) of the device (e.g., 105).

As described above, the respective components of the wireless communication system based on the multi-hop cluster-tree structure, according to one or more embodiments of the present invention, may be implemented by hardware such as a semiconductor processor, software such as an application program, or a combination thereof.

Also, the functions used for input and output data processing in the elements of the wireless communication system based on the multi-hop cluster-tree structure, according to one or more embodiments of the present invention, may be embodied as computer-readable codes on a non-transitory computer-readable recording medium. Data or information necessary for performing the functions may be input, output, or displayed through a combination of the recording medium and a device such as a computer. The non-transitory computer-readable recording medium may be any recording medium that can store data which can be thereafter read by a computer system. Examples of the non-transitory computer-readable recording medium may include read-only memory (ROM), random access memory (RAM), compact disk-ROMs (CD-ROMs), magnetic tapes, floppy disks, optical data storage devices, hard disks, and portable storage devices, and may also include media implemented in the form of carrier wave (e.g., transmission through the Internet). The non-transitory computer-readable recording medium can also be distributed over network-coupled computer systems (e.g., Internet, mobile communication networks, etc.) so that the computer-readable code is stored and executed in a distributed fashion.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

What is claimed is:

1. A method for increasing lifetime of network devices of a cluster-tree structured multi-hop wireless communication system which comprises a main network control device, referred to access point (AP) acting as a parent device, managing network operation and a plurality of network devices operating in a battery-powered mode, wherein a part of the plurality of network devices operate as a router having one or more child devices, the others of the plurality of network devices operate as an end device not having a child device, and the AP, the routers and the end devices are connected in a parent-child device relationship, the method comprising:

equalizing, by the AP, the average power consumption of the plurality of network devices by exchanging the role of the router and the end device, which each require different power consumption, without interrupting normal network operation including data transmission and reception operation while keeping network connectivity, wherein the exchanging the role of the router and the end device comprises:

receiving, by the router and the end device, a role-change message transmitted from the parent device;

replacing, by the router, in response to the role-change message transmitted from the parent device, the role of the end device seamlessly by using an address and resources previously allocated to the end device; and replacing, by the end device, in response to the role-change message transmitted from the parent device, the role of the router seamlessly by using an address and resources previously allocated to the router.

2. The method of claim 1, wherein the equalizing average power consumption of the plurality of network devices by exchanging the role of the router and the end device requiring different power consumption without interrupting the normal network operation comprises:

(A) by the parent device, selecting one of child routers in a sequential manner and selects one of child end devices that can take the role of the selected child router in consideration of network connectivity and battery condition of child end devices; and (B) by the parent device, making the selected child router operate as an end device, and making the selected child end device operate as a router to take the role of the selected child router, without interrupting the normal network operation.

3. The method of claim 2, wherein step (A) comprises:

(A-1) by the parent device, sequentially selecting its child router in an one by one manner, and transmitting a role-change start message to the selected child router and all of its child end devices having the same network depth as the selected child router without interrupting normal network operation;

(A-2) by the selected child router that has received the role-change start message, repeatedly transmitting a role-change router information message including information on the selected child router itself a predetermined number of times;

(A-3) by the child end devices that have received the role-change start message, attempting to receive the role-change router information message transmitted by the selected child router;

(A-4) by the child end devices that have received the role-change router information message, transmitting to the parent device a role-change candidate message that includes signal strength of the received role-change router information message signal, battery condition and previous operation record as a router; and (A-5) by the parent device, selecting a child end device having a best condition among child end devices that have transmitted the role-change candidate message, as the device that can take the role of the selected child router.

4. The method of claim 3, further comprising, by the parent device, repeating step (A-1) when the selected child router fails to receive the role-change router information message transmitted by the selected child router in step (A-2).

5. The method of claim 3, wherein (A-5) comprises:

by the parent device, selecting an end device that has experienced the highest received signal strength and has remaining battery power larger than a reference value among child end devices that did not operate as a router previously, as the device that can take the role of the selected child router; and by the parent device, in the presence of no end device satisfying the above condition, selecting an end device that has experienced the highest received signal strength among child end devices that have remaining battery power larger than that of the selected child router, as the device that can take the role of the selected child router.

6. The method of claim 2, wherein step (B) comprises:

(B-1) by the parent device, transmitting respectively a first and second role-change message to the child router and the child end device selected through step (A) during a regular communication interval, and making the selected child router as a child end device and then the selected child end device as a child router;

(B-2) by the selected child router, operating as an end device by using the address of the child end device included in the first role-change message after receiving the first role-change message; and (B-3) by the selected child end device, operating as a router by using the address of the selected child router included in the second role-change message after receiving the second role-change message.

7. The method of claim 6, wherein step (B-3) comprises:

by the selected child end device, operating as the router by using the address of the selected child router included in the role-change message after receiving the second role-change message, and confirming network operation with child devices;

by the device operating as a router, transmitting a role-change-enable message to a parent device after confirming normality of network operation; and by the device operating as a router, transmitting a role-change-unable message to the parent device and starting to operate as the end device as being before, after confirming abnormality of network operation.

8. The method of claim 7, further comprising, when the parent device has received the role-change-unable message:

by the parent device, selecting an end device as the device that can take the role of the selected child router among child end devices except the end device that has transmitted the role-change-unable message, in consideration of network connectivity and remaining battery power condition; and by the parent device, transmitting the second role-change message to the end device to make the end device operate as a router through step (B-3).

9. The method of claim 6, further comprising:

by the selected child end device operating as a router, making child devices of the selected child end device itself change roles through step (A) and step (B) as another parent device.

10. A multi-hop cluster-tree structured wireless communication system comprising:

child routers and child end devices which are connected to a parent device in parallel, wherein a child router selected among the child routers in a sequential manner and the child end devices transmit information for a role-change in response to a role-change start message transmitted from the parent device;

the parent device selects a child end device among the child end devices in consideration of the information for the role-change transmitted from child end devices and transmits a role-change message to make the selected child end device and the selected child router exchange roles with each other;

the parent device makes the selected child end device operate as a child router by using the address of the selected child router by sending a first role-change message to the selected child end device; and the parent device makes the selected child router operate as a child end device using the address of the selected child end device by sending a second role-change message to the selected child router, wherein the multi-hop cluster-tree structured wireless communication system is for equalizing, by an access point acting as a parent device, average power consumption of the plurality of network devices by exchanging the role of the router and the end device, which each require different power consumption, without interrupting normal network operation including data transmission and reception operation while keeping network connectivity, and wherein the exchanging the role of the router and the end device comprises:

receiving, by the router and the end device, the role-change message transmitted from the parent device;

replacing, by the router, in response to the role-change message transmitted from the parent device, the role of the end device seamlessly by using an address and resources previously allocated to the end device; and replacing, by the end device, in response to the role-change message transmitted from the parent device, the role of the router seamlessly by using an address and resources previously allocated to the router.

11. A non-transitory computer readable storage medium storing one or more programs configured to be executed by one or more processors at a computer comprising:

a function of, by a parent device, receiving each of information for a role-change transmitted from a selected child router and child end devices;

a function of, by the parent device, selecting a child end device among child end devices in consideration of the received information from the child end devices;

a function of, by the parent device, transmitting a message to make the selected child end device and the selected child router exchange roles with each other;

a function of, by the parent device, transmitting a first role-change message to the selected child end device to make the selected child end device operate as a child router using the address of the selected child router included in the first role-change message; and a function of, by the parent device, transmitting a second role-change message to the selected child router to make the selected child router operate as a child end device using the address of the selected child end device included in the second role-change message, wherein the non-transitory storage medium is for operation management of a multi-hop cluster-tree structure wireless communication system in which the child routers and the child end devices are connected to the parent device in parallel, wherein the non-transitory storage medium is for equalizing, by an access point acting as a parent device, average power consumption of the plurality of network devices by exchanging the role of the router and the end device, which each require different power consumption, without interrupting normal network operation including data transmission and reception operation while keeping network connectivity, wherein the exchanging the role of the router and the end device comprises:

receiving, by the router and the end device, a role-change message transmitted from a parent device;

replacing, by the router, in response to the role-change message transmitted from the parent device, the role of the end device seamlessly by using an address and resources previously allocated to the end device; and replacing, by the end device, in response to the role-change message transmitted from the parent device, the role of the router seamlessly by using an address and resources previously allocated to the router.

* * * * *